Oct. 13, 1959 — D. E. BECKETT ET AL — 2,908,292

VALVE SPOOL

Filed June 9, 1955 — 3 Sheets-Sheet 1

INVENTORS
DONALD E. BECKETT
WILLIAM N. BECKETT
BY
J. Warren Kinney Jr.
ATTORNEY

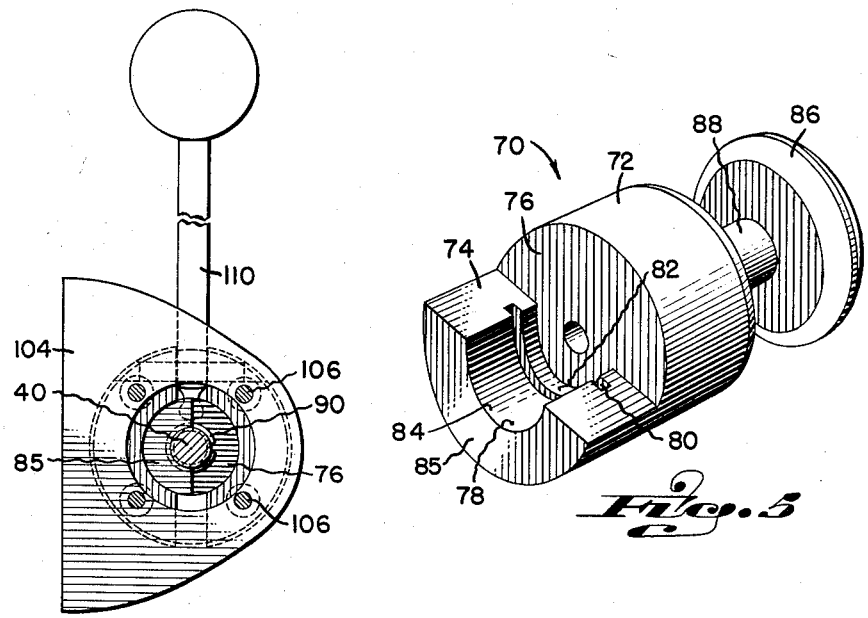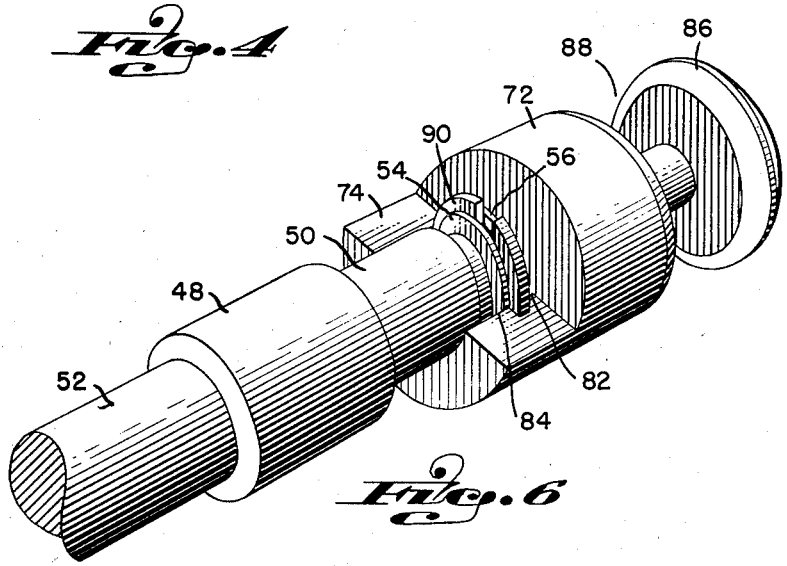

INVENTORS
DONALD E. BECKETT
WILLIAM N. BECKETT

# United States Patent Office 2,908,292
Patented Oct. 13, 1959

2,908,292

VALVE SPOOL

Donald E. Beckett and William N. Beckett, Wilmington, Ohio, assignors to Beckett-Harcum Co., Wilmington, Ohio, a corporation of Ohio Application June 9, 1955, Serial No. 514,289

7 Claims. (Cl. 137—622)

This invention relates to a valve assembly, and more particularly to a valve spool, one or both ends of which are provided with means for enabling various valve spool actuator elements to be securely though releasably associated therewith.

An object of the invention is to provide a valve spool, one or both ends of which are provided with means for enabling attachments to be secured for providing relative rotary motion with respect to the spool while precluding relative endwise movement relative thereto.

A further object of the invention is to provide a valve spool, one or both ends of which are provided with spaced cylindrical portions which are separated by an annular groove dimensioned to receive a retaining element by which an attachment may be secured to the spool.

These and other objects are attained by the means described herein and as disclosed in the accompanying drawings, in which:

Fig. 4 is a view taken on line 4—4 of Fig. 2.

Fig. 5 is a perspective view of an attachment element adapted to be securely though releasably associated with an end of the valve spool of Fig. 1.

Fig. 6 is a perspective view showing the attachment element of Fig. 5 operatively associated with an end of the valve spool of Fig. 1.

Figure 2:
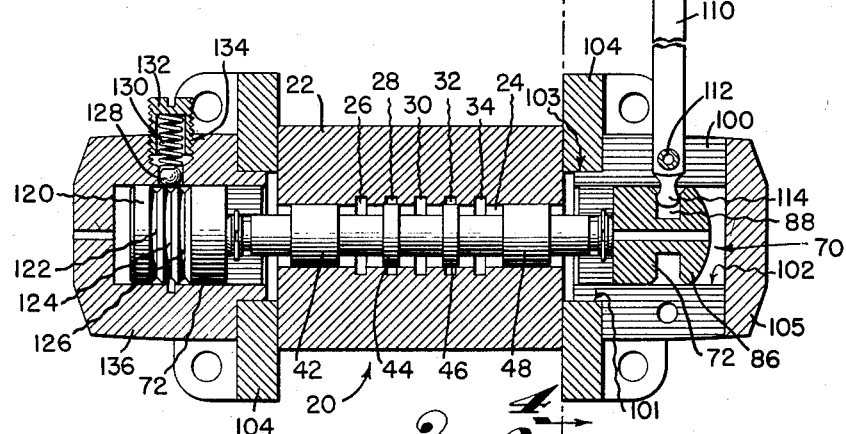
Fig. 2 is a vertical section through a valve assembly embodying the valve spool of Fig. 1 illustrating the manner in which dissimilar valve spool actuating attachments may be associated with opposite ends of the valve spool.

With reference to Fig. 2, the numeral 20 denotes generally a valve assembly which comprises a valve body 22 having an axially disposed spool-receptive bore 24 extending therethrough, said bore being provided with a plurality of annular ports 26, 28, 30, 32 and 34, which are connected to various inlet and outlet ports, not illustrated.

The numeral 40 denotes generally a valve spool provided with lands 42, 44, 46 and 48, which co-operate with bore 24 and which are adapted to selectively control the passage of pressure media through various of the ports 26 through 34 of the valve body.

In the preferred embodiment of the invention, one or both ends of the spool terminate in a cylindrical end 50 of a diameter less than the diameter of lands 42, 44, 46 and 48, said diameter approximating the diameter of the undercut portions 52 disposed between the lands.

The cylindrical ends 50 are provided with a pair of substantially cylindrical portions 54 and 56 which are separated by an annular groove 58. Preferably, though not necessarily, the cylindrical ends are undercut as at 60 for providing an annular undercut or channelway between cylindrical portions 50 and 54.

Figure 1:
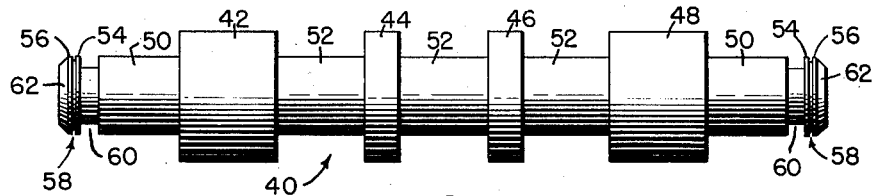
Fig. 1 is a side elevational view of a valve spool the ends of which embody the teachings of the present invention.

The end of the cylindrical portions may be provided with a frusto-conical tip 62, as clearly illustrated in Fig. 1.

With reference now to Fig. 5, the numeral 70 denotes generally a typical attachment for an end of the valve spool, said attachment comprising a cylindrical portion 72 having an end 74 approximating a half cylinder, in the sense that end 74 projects forwardly of face 76 at right angles to the axis of cylindrical portion 72, end portion 74 being disposed entirely on one side of a diameter of portion 72. End portion 74 is provided with a semi-cylindrical seat portion 78 in which a groove 80 is provided for forming a forward seat portion and a rearward seat portion 82 and 84, respectively.

The particular attachment illustrated in Fig. 5 includes a button type of abutment 86 in spaced relation with and integrally connected to cylindrical portion 72 by means of a reduced or neck portion 88.

With reference now to Fig. 6, it will be noted that front and rear portions 82 and 84 of the semi-annular seat 78 are complementary to the cylindrical portion 50 of the valve spool. A retaining member, such as, by way of example, split ring 90, is seated in annular groove 58 of the spool, and those portions of the retaining member which extend radially from cylindrical portions 54 and 56 are receivable in recess 80 of the attachment.

Figure 3:
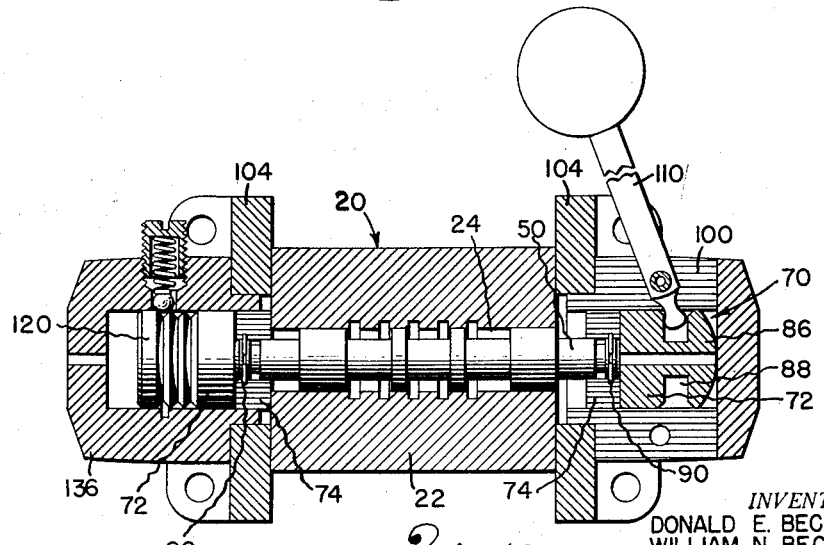
Fig. 3 is a view similar to Fig. 2 illustrating the relationship of the various parts when the valve spool has been actuated to one end of its stroke.

As best illustrated in Figs. 2 and 3, an attachment guide 100 having an axial bore 102 dimensioned to slidably receive cylindrical portion 72 of an attachment member such as, by way of example, 70 of Fig. 5, is provided, said guide being securely though releasably mounted in axial alignment with the spool-receptive bore 24 of the valve housing. If desired, guide 100 may include a forwardly projecting portion 103 dimensioned to be received within bore 101 in end plate 104, which may, in turn, be secured to opposite ends of valve body 22 by means of bolts or the like 106, note Fig. 4.

In Figs. 2 and 3, a manually operable lever 110 has been provided for enabling an operator to impart endwise axial movement to attachment 70. The lever may be pivotally secured as at 112 relative to portions of guide 100 for disposing end 114 within neck 88, between adjacent faces of elements 72 and 86.

From the foregoing it will be noted that attachment 70 has thus been securely mounted relative to an end of spool 40 for relative rotational movement therewith, but against relative endwise movement therewith.

With further reference to Figs. 2 and 3, it will be noted that the opposite, that is, left end of the spool has been provided with a modified form of attachment denoted generally by the numeral 120, it being understood that the primary distinction between attachments 120 and 70 resides in the outer ends thereof, that is, neck portion 88 and button 86 of attachment 70 have been replaced by a cylindrical portion provided with three laterally spaced grooves 122, 124 and 126, said grooves being adapted to be selectively engaged by spherical member 128 normally urged inwardly by means of spring 130 housed within a hollow cap element 132 which threadably engages bore 134 provided in attachment guide 136 which, for all practical purposes, is similar to guide 100. The purpose of attachment 120 is to securely though releasably maintain the spool in whatever position it is placed incident to actuation of lever 110.

Figure 7:
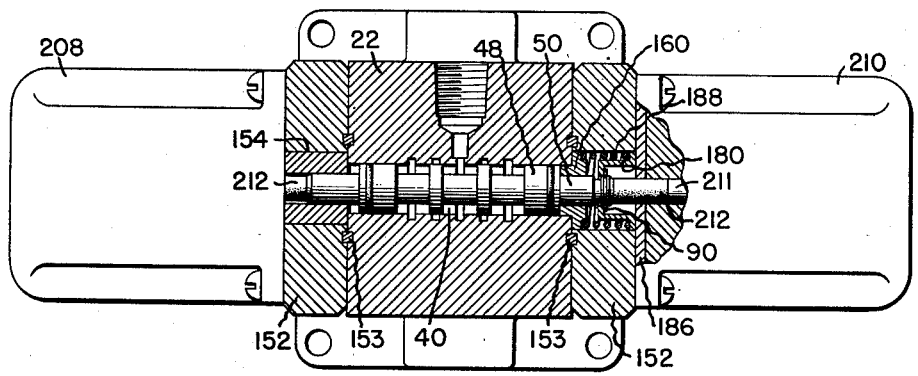
Fig. 7 is a sectional view showing a modified type of valve assembly wherein valve spool centering means have been associated with one end of the valve spool.
Figure 8:
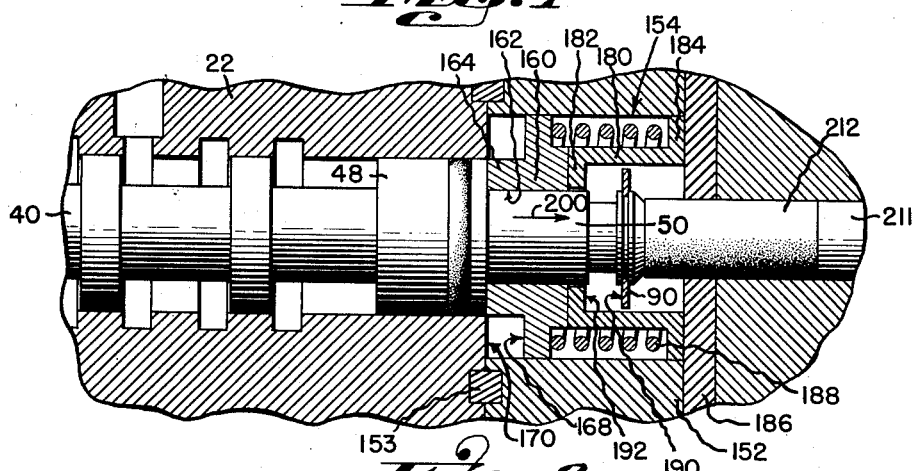
Fig. 8 is an enlarged view of the right end of the valve spool assembly of Fig. 7 illustrating the relationship of the parts during those periods of time when the valve spool has been shifted to the right.
Figure 9:
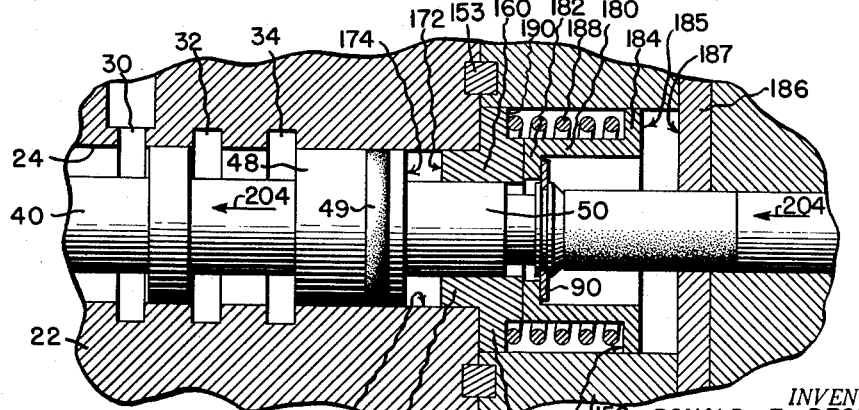
Fig. 9 is a view similar to Fig. 8 but illustrating the relationship of the parts when the valve spool has been shifted to the left.

With reference now to Figs. 7, 8 and 9, we have illustrated a manner in which a single spring may be associated with one end of a spool 40 for normally and yieldably urging the spool to a predetermined neutral or central position relative to the valve body.

The numeral 152 denotes end plates which are suitably secured to the opposite ends of body portion 22, said end plates being secured in fluid-tight relationship with the body portion by means of O-rings 153. End plates 152 are provided with an axial bore 154 within which a spring retainer denoted generally by the numeral 160 is slidably mounted. Said spring retainer is provided with a central bore 162 dimensioned to slidably engage the cylindrical end 50 of a spool 40, said retainer including a plug portion 164 dimensioned to slidably engage and be received within the end of bore 24 in body 22, and a flanged portion 166 having a face 168 adapted to abuttingly engage end wall 170 of body 22 for thereby limiting movement of the retainer to the left, note Fig. 8.

The plug also includes an end face 172 adapted to abuttingly engage outer face 174 of land 48 of the reciprocable spool 40, note Fig. 9.

The numeral 180 denotes generally a spring guide which includes a first portion 182 adapted to abuttingly engage the rear face of spring retainer 160, and a second portion 184 having a face 185 adapted to abuttingly engage face 187 of a stop member 186 suitably secured to and carired by end member 152.

A spring 188 surrounds spring guide 180, one end of the spring abutting face 190 of the spring retainer 160, the other end abutting face 183 of the second portion 184 of the spring guide.

A retaining member 90 is mounted within groove 56 of the spool, face 190 thereof being engageable by face 192 of the first portion 182 of spring guide 180.

With reference now to Fig. 7, it will be noted that spring 188 will normally and yieldably urge the spring retainer toward body portion 22 while simultaneously urging the spring guide in an opposite direction to and in an abutting engagement with plate 186 whereby the spool will be urged to and yieldably maintained in a central position relative to the valve body.

With reference now to Fig. 8, it will be noted that when spool 40 has been shifted to the right in the direction of headed arrow 200, spring 188 will be compressed incident to movement of spring retainer 160 to the right by reason of face 174 of end land 48 engaging end 172 of annular plug 164. The overall travel of the spool to the right will be limited by engagement of adjacent faces of the spring retainer with first portion 182 of the spring guide, it being noted that face 185 of the second portion 184 of the spring guide is already in engagement with face 187 of end plate 186.

When the force shifting the spool to the right, as in Fig. 8, has been released, spring 188 will become effective for returning the spool, spring 188 and spring retainer 160 to the central or neutral position illustrated in Fig. 7.

With reference now to Fig. 9, it will be noted that axial shifting of spool 40 to the left in the direction of headed arrows 204 will result in spring 188 being compressed incident to engagement of face 190 of member 90 with face 192 of the first portion 182 of the spring guide, which will result in axial translation of the spring guide to the left until the adjacent faces of spring retainer and spring guide are in the abutting relationship illustrated in Fig. 9.

Release of axial force 204 will permit spring 188 to become effective to return the parts to the relative position illustrated in Fig. 7.

It should be understood that the present invention is neither directed to nor concerned with the particular means utilized for imparting endwise axial movement to spool 40 and that such means may, if desired, be manual, as, by way of example, is illustrated in Figs. 2 and 3, however, solely by way of example, it may be assumed that the axial movement in directions 200 and 204 may be accomplished by means of solenoids contained within housings 208 and 210 secured to and mounted in axial alignment with opposite ends of body portion 22. The plungers of the solenoids housed within elements 208 and 210 are indicated by the numerals 211, whereas the numeral 212 denotes a spacer element of nylon, or some other suitable material, which when interposed between an end of spool 40 and armature 211 will insure quiet operation of the device.

If desired, an O-ring 49 may be secured to and carried by end land 48, however this detail forms no part of the present invention.

What is claimed is:

1. The combination of a valve spool adapted to be slidably positioned in the bore of a valve body at least one end of which spool terminates in an attachement head which includes a frusto-conical tip the base of which is coincident with the forward peripheral edge of the first of a pair of spaced cylindrical portions separated by an annular groove, a spool actuator attachment including a portion adapted to fit over said head, said attachment including an annular groove, and a retaining member seated in and spanning the annular grooves of the head and attachment for securely though releasably connecting the attachment to the spool.

2. A valve assembly comprising a valve body and a reciprocable valving spool having cylindrical ends which project from opposite ends of said body, said ends terminating in heads including a frusto-conical tip the base of which is of a diameter approximating the diameter of the cylindrical portion from which it is separated by an annular groove, an attachment for each head including a cylindrical member having an end approximating a half cylinder provided with a seat dimensioned to fit radially over and receive the head and adjacent cylindrical portion of the spool, said seat including a groove in radial alignment with the annular groove of the head, a retaining member received in and spanning the grooves of the head and attachment, an attachment guide having an axial bore within which the attachment is slidably mounted, and means for securing the guide to and in axial alignment with an end of the valve body for precluding accidental or unintentional disassociation of the attachment from the spool head.

3. A valve assembly comprising a valve body and a reciprocable valving spool having cylindrical ends which project from opposite ends of said body, said ends terminating in heads having a base which is of a diameter approximating the diameter of an adjacent cylindrical end from which it is separated by an annular groove, a retaining member seated in said annular groove and projecting radially beyond the base of said tip, and attachments for each head including a cylindrical member having an end approximating a half cylinder provided with a semi annular seat and groove dimensioned to fit radially over and receive the retaining member, head and adjacent cylindrical end of the spool.

4. A valve assembly comprising a valve body and a reciprocable valving spool having cylindrical ends which project from opposite ends of said body, said ends terminating in heads having a base which is of a diameter approximating the diameter of an adjacent cylindrical end from which it is separated by an annular groove, a retaining member seated in said annular groove and projecting radially beyond the base of said tip, attachments for each head including a cylindrical member having an end approximating a half cylinder provided with a semi annular seat and groove dimensioned to fit radially over and receive the retaining member, head and adjacent cylindrical end of the spool, attachment-guides having an axial bore within which an attachment is slidably and rotatably mounted, and means for securing the attachment guides to and in axial alignment with opposite ends of the valve body for precluding accidental or unintentional disassociation of the attachment from the spool head.

5. A spool valve assembly comprising a valve body having a spool receptive bore axially therethrough, a plurality of annular ports in open communication with said bore, a reciprocable valving spool having lands thereon for co-operation with said ports, said spool having a cylindrical end of a diameter less than the diameter of said lands, said spool terminating in a head having a frusto-conical tip the base of which is of a diameter approximating the diameter of the cylindrical end from which it is separated by an annular groove, a retaining member seated in said groove and projecting radially therefrom, a spring retainer including a central bore dimensioned to slidably engage the cylindrical end of the spool and an annular plug dimensioned to slidably engage the spool receptive bore of the valve body, said plug including a first end adapted to abuttingly engage the adjacent face of the endmost land of the spool, a spring guide including a first portion adapted to abuttingly engage that end of the plug portion of the spring retainer remote from its said first end, and a rearward face, a stop member secured relative to and in spaced relationship with the adjacent end of the valve body, said rearward face adapted to abuttingly engage said stop member, a spring surrounding the spring guide with one end of the spring abutting the spring retainer and the other end abutting the spring guide for normally and yieldably urging the spring retainer and spring guide in opposite directions, and for disposing the spool in a predetermined central position relative to the valve body, said spring guide including a second portion adapted to abuttingly engage said retaining member, whereby movement of the spool toward said stop member moves the spring retainer relative to the valve body and spool by reason of the outermost face of the land contacting the first end of the plug of said spring retainer for compressing the spring, and wherein movement of the spool in the opposite direction releases the spring to return the spring retainer to its original position, and movement of the spool away from said stop member shifting the spring guide toward and in abutting relationship with the spring retainer against the counterforce of said spring, and wherein the overall travel of said spring guide is limited by abutment of the adjacent faces of the spring guide and retainer.

6. A valve assembly comprising a valve body and a reciprocable valving spool having at least one cylindrical end which projects from an end of said body, said end terminating in a head having a base which is of a diameter approximating the dimeter of the cylindrical end from which it is separated by an annular groove, means secured to and carried by the valve body having a bore in axial alignment with said valving spool, and spool actuator means rotatably and slidably disposed in said bore and secured in endwise axial relationship to the head of the spool for endwise actuation of the spool.

7. A valve assembly comprising a valve body and a reciprocable valving spool having at least one cylindrical end which projects from an end of said body, said end terminating in a head having a base which is of a diameter approximating the diameter of the cylindrical end from which it is separated by an annular groove, an actuator attachment for said spool comprising an elongate member having a body portion symmetrical about its longitudinal axis, one end of said member provided with a spool-head receiving seat, means interconnecting said attachment to and in endwise axial relationship with said spool-head, an attachment guide having an axial bore dimensioned to slidably receive said attachment, and means securing said guide to the valve body in axial alignment with said spool-head and actuator attachment.

References Cited in the file of this patent

UNITED STATES PATENTS

| | | |
|---|---|---|
| 1,431,286 | Brown | Oct. 10, 1922 |
| 2,364,288 | Haggerty | Dec. 5, 1944 |
| 2,427,681 | Lombard | Sept. 23, 1947 |
| 2,572,705 | Edman | Oct. 23, 1951 |
| 2,600,746 | Ernst | June 17, 1952 |
| 2,610,022 | Meddock | Sept. 9, 1952 |
| 2,648,313 | Clifton | Aug. 11, 1953 |
| 2,732,860 | Ray | Jan. 31, 1956 |
| 2,743,900 | Holzer et al. | May 1, 1956 |
| 2,765,808 | Tydeman | Oct. 9, 1956 |